US012037917B2

(12) United States Patent
Takata et al.

(10) Patent No.: US 12,037,917 B2
(45) Date of Patent: Jul. 16, 2024

(54) STEAM TURBINE

(71) Applicant: MITSUBISHI HEAVY INDUSTRIES, LTD., Tokyo (JP)

(72) Inventors: Ryo Takata, Tokyo (JP); Yasuhiro Sasao, Yokohama (JP); Hideaki Sato, Yokohama (JP); Soichiro Tabata, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/017,774

(22) PCT Filed: Sep. 28, 2020

(86) PCT No.: PCT/JP2020/036528

§ 371 (c)(1),
(2) Date: Jan. 24, 2023

(87) PCT Pub. No.: WO2022/064670

PCT Pub. Date: Mar. 31, 2022

(65) Prior Publication Data

US 2023/0193788 A1 Jun. 22, 2023

(51) Int. Cl.
*F01D 25/32* (2006.01)
*F01D 9/04* (2006.01)
*F01D 25/24* (2006.01)

(52) U.S. Cl.
CPC ............... *F01D 25/32* (2013.01); *F01D 9/04* (2013.01); *F01D 25/24* (2013.01); *F05D 2220/31* (2013.01); *F05D 2260/602* (2013.01)

(58) Field of Classification Search
CPC ........ F01D 25/32; F01D 25/24; F01D 25/246; F01D 25/243; F01D 19/04; F01D 19/02;
(Continued)

(56) References Cited

U.S. PATENT DOCUMENTS 7,789,618 B2 * 9/2010 Burdgick ................ F01D 25/32 415/169.4
2006/0051199 A1 3/2006 Guemmer
(Continued)

FOREIGN PATENT DOCUMENTS

JP S61-265305 A 11/1986
JP H06-002503 A 1/1994
(Continued)

OTHER PUBLICATIONS

International Search Report dated Nov. 24, 2020, issued in counterpart application No. PCT/JP2020/036528 with English translation. (6 pages).

(Continued)

*Primary Examiner* — Brian P Wolcott
*Assistant Examiner* — Maxime M Adjagbe
(74) *Attorney, Agent, or Firm* — WHDA, LLP

(57) ABSTRACT

This steam turbine is provided with a rotor shaft which rotates about an axis, a plurality of rows of moving blades which are fixed to the outside, in the radial direction, of the rotor shaft, and which are disposed spaced apart in the axial direction along the axis, a casing disposed in such a way as to cover the rotor shaft and the plurality of rows of moving blades, and rows of stationary blades which are fixed to the inside, in the radial direction, of the casing, are disposed spaced apart in the axial direction, and which are disposed on a first side, in the axial direction, of each of the plurality of rows of moving blades, wherein the rows of stationary blades are provided with: a plurality of stationary blades which are disposed spaced apart in the circumferential direction, and each of which extends in the radial direction.

6 Claims, 10 Drawing Sheets

(58) Field of Classification Search
CPC . F01D 19/041; F01D 9/04; F01D 9/02; F01D 9/041; F05D 2220/31; F05D 2220/72; F05D 2260/602; F05D 2260/2322
See application file for complete search history.

(56) References Cited

U.S. PATENT DOCUMENTS

| | | | | |
|---|---|---|---|---|
| 2009/0123276 | A1* | 5/2009 | Greim | F01D 5/141 415/193 |
| 2010/0221095 | A1 | 9/2010 | Kostyuchenko et al. | |
| 2011/0103944 | A1* | 5/2011 | Sanchez | F01D 9/041 415/209.3 |
| 2015/0003969 | A1* | 1/2015 | Shibukawa | F01D 25/32 415/169.3 |
| 2015/0176435 | A1* | 6/2015 | Nagao | F01D 25/243 415/169.2 |
| 2016/0090861 | A1* | 3/2016 | Shibukawa | F01D 25/24 415/177 |
| 2016/0169051 | A1* | 6/2016 | Takata | F01D 9/041 29/889.7 |
| 2021/0262355 | A1 | 8/2021 | Sato et al. | |

FOREIGN PATENT DOCUMENTS

| | | | |
|---|---|---|---|
| JP | H06-123202 | A | 5/1994 |
| JP | H08-121107 | A | 5/1996 |
| JP | H08-254104 | A | 10/1996 |
| JP | 3093479 | B2 | 10/2000 |
| JP | 2005-113787 | A | 4/2005 |
| JP | 2009-121468 | A | 6/2009 |
| JP | 2010-203438 | A | 9/2010 |
| JP | 5651532 | B2 | 1/2015 |
| JP | 6766528 | B2 | 8/2015 |
| JP | 2016-084787 | A | 5/2016 |
| JP | 2019-035384 | A | 3/2019 |
| JP | 2020-002937 | A | 1/2020 |

OTHER PUBLICATIONS

Written Opinion dated Nov. 24, 2020, issued in counterpart application No. PCT/2020/036528, with English Translation. (10 pages).

* cited by examiner

STEAM TURBINE

TECHNICAL FIELD

The present disclosure relates to a steam turbine.

BACKGROUND ART

A steam turbine has a plurality of rows of compression stages in a casing. Steam flowing from an upstream side to a downstream side through the plurality of rows of compression stages in the casing expands as the steam flows toward the downstream side, which causes a decrease in pressure and temperature thereof. Particularly, in some cases, the humidity of the steam increases in the vicinity of a last compression stage row, which causes moisture in the steam to become liquid droplets. An increase in humidity of the steam results in a decrease in efficiency of the steam turbine. In addition, in a case where the moisture in the steam becomes liquid droplets, so-called erosion, in which the liquid droplets scattered from a stator vane corrode a last rotor vane row, may be caused.

With regard to this, for example, disclosed in PTL 1 is a configuration in which an inner peripheral surface of a diaphragm outer ring provided in a casing is provided with a suction portion for recovery of liquid droplets (water droplets or a water film) from the inner peripheral surface of the diaphragm outer ring. In this configuration, the suction portion communicates with a hollow portion formed in the diaphragm outer ring from a suction side of a stator vane toward a pressure side of an adjacent stator vane.

According to such a configuration, liquid droplets adhering to a vane surface of a stator vane in a last stator vane row or to an inner wall surface of the diaphragm outer ring are sucked through the suction portion so that the liquid droplets are restrained from reaching a tip of a rotor vane on a downstream side, and erosion is made less likely to occur.

CITATION LIST

Patent Literature

[PTL 1] Japanese Unexamined Patent Application Publication No. 2019-35384

SUMMARY OF INVENTION

Technical Problem

However, it is always desired that occurrence of erosion is suppressed more effectively.

The present disclosure has been made to solve the above-described problems, and an object thereof is to provide a steam turbine with which it is possible to more effectively suppress occurrence of erosion.

Solution to Problem

According to an aspect of the present disclosure for solving the above-described problem, there is provided a steam turbine including: a rotor shaft that rotates around an axis; a plurality of rotor vane rows that are disposed at intervals in an axial direction along the axis, the rotor vane rows being fixed to a portion of the rotor shaft that is on an outer side in a radial direction; a casing that is disposed to cover the rotor shaft and the plurality of rotor vane rows; and stator vane rows that are disposed at intervals in the axial direction and that are disposed on a first side in the axial direction with respect to the plurality of rotor vane rows, respectively, the stator vane rows being fixed to a portion of the casing that is on an inner side in the radial direction. The stator vane row includes a plurality of stator vanes that are disposed at intervals in a circumferential direction and each of which extends in the radial direction, an outer ring that has an annular shape and that is disposed closer to the outer side in the radial direction than the plurality of stator vanes are, an inner ring that has an annular shape and that is disposed closer to an inner side in the radial direction than the plurality of stator vanes are, a concave portion that is formed at a ring inner peripheral surface facing the inner side in the radial direction at the outer ring and that is recessed toward the outer side in the radial direction between stator vanes adjacent to each other in the circumferential direction, and a discharge portion that is open in the concave portion and through which liquid droplets accumulated in the concave portion are discharged to an outside.

Advantageous Effects of Invention

According to the steam turbine of the present disclosure, it is possible to more effectively suppress occurrence of erosion.

DESCRIPTION OF EMBODIMENTS

First Embodiment (Configuration of Steam Turbine)

Figure 1:
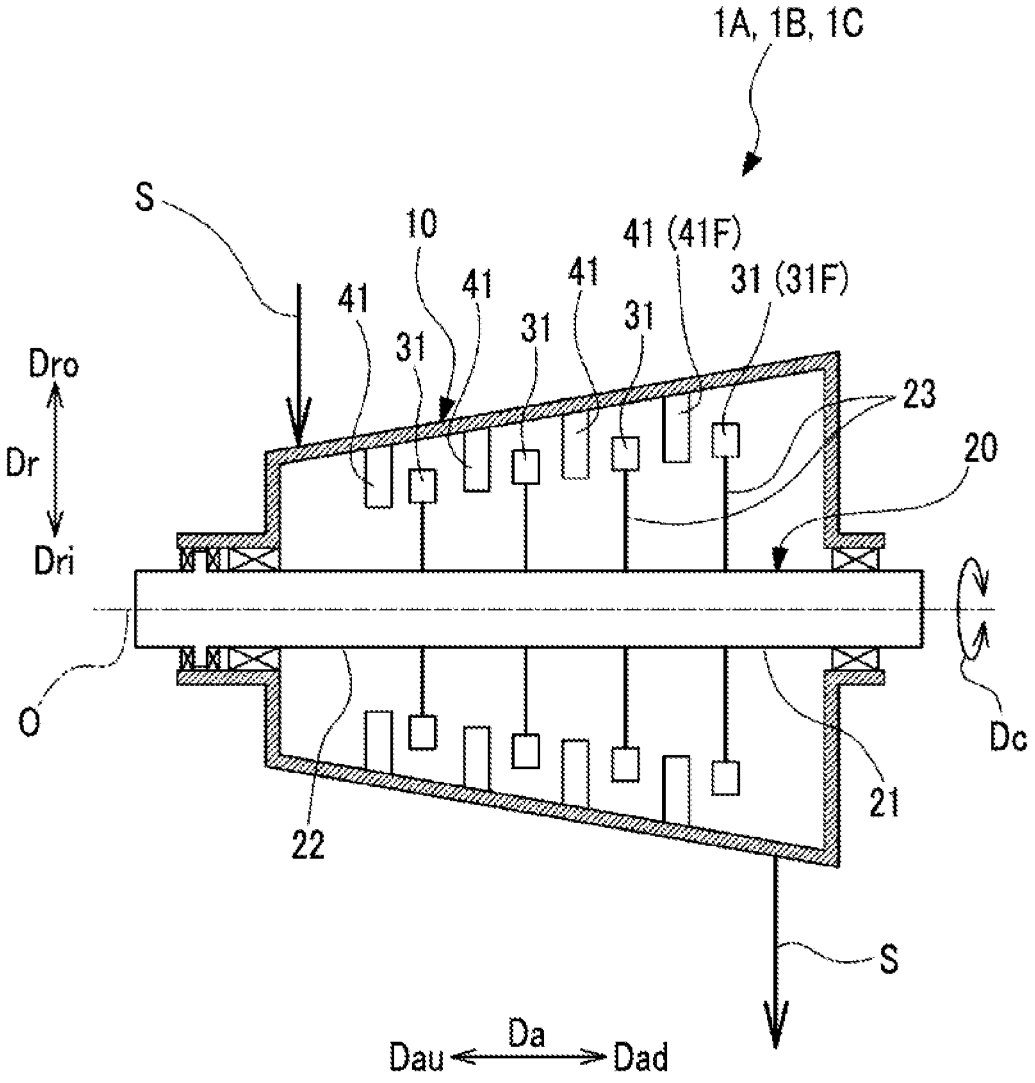
FIG. 1 is a schematic view showing a schematic configuration of a steam turbine according to an embodiment of the present disclosure.

As shown in FIG. 1, a steam turbine 1A of the present embodiment includes a rotor 20 that rotates around an axis O and a casing 10.

Note that, in the following description, for the sake of convenience, a direction in which the axis O extends will be simply referred to as an axial direction Da, a radial direction of a shaft core portion 22 (which will be described later) based on the axis O will be simply referred to as a radial direction Dr, and a circumferential direction of the shaft core portion 22 that extends around the axis O will be simply referred to as a circumferential direction Dc.

(Configuration of Rotor)

The rotor 20 includes a rotor shaft 21 and rotor vane rows 31.

The rotor shaft 21 is disposed to be rotatable around the axis O. The rotor shaft 21 includes the shaft core portion 22 and a plurality of disc portions 23. The shaft core portion 22 has a columnar shape around the axis O and extends in the axial direction Da. The plurality of disc portions 23 are disposed at intervals in the axial direction Da. Each of the disc portions 23 is disposed to extend from the shaft core portion 22 to an outer side Dro in the radial direction Dr.

(Configuration of Rotor Vane Row)

The rotor vane rows 31 are fixed to a portion of the rotor shaft 21 that is on the outer side Dro in the radial direction Dr. The rotor vane rows 31 are attached to outer peripheries of the disc portions 23 which are outer peripheral portions of the rotor shaft 21. A plurality of the rotor vane rows 31 are disposed at intervals along the axial direction Da of the rotor shaft 21. In the case of the present embodiment, four rotor vane rows 31 are disposed, for example. Therefore, in the case of the present embodiment, as the rotor vane rows 31, first to fourth stages of the rotor vane rows 31 are disposed.

Figure 2:
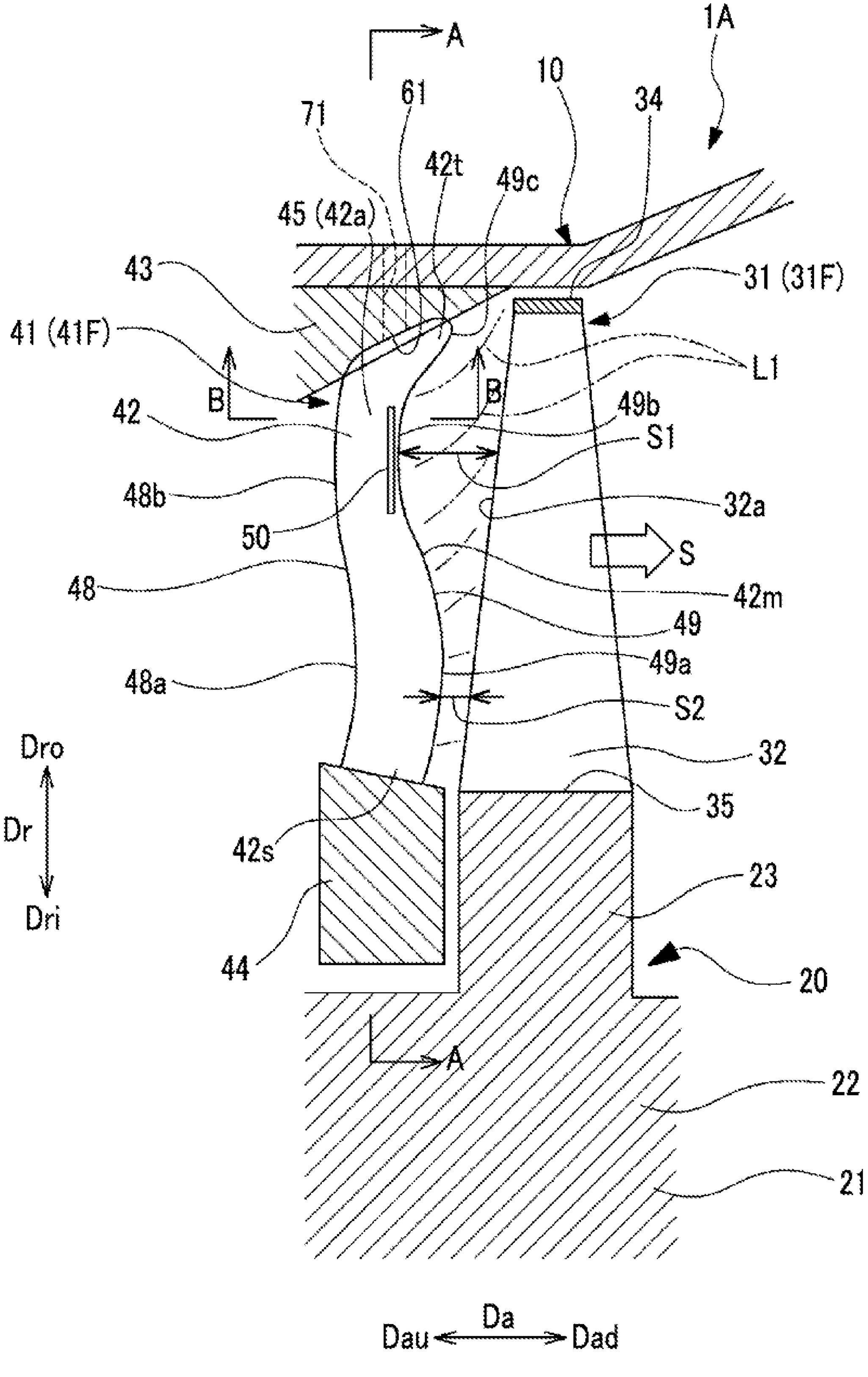
FIG. 2 is a cross-sectional view showing a last stator vane row and a last rotor vane row of the steam turbine in a first embodiment of the present disclosure.

As shown in FIG. 2, each of the rotor vane rows 31 includes a plurality of rotor vanes 32 arranged in the circumferential direction Dc, a shroud 34, and a platform 35. Each of the rotor vanes 32 extends in the radial direction Dr. The shroud 34 is disposed closer to the outer side Dro in the radial direction Dr than the rotor vanes 32 are. The platform 35 is disposed closer to an inner side Dri in the radial direction Dr than the rotor vanes 32 are. Steam S flows through an annular space between the shroud 34 and the platform 35 at the rotor vanes 32.

(Configuration of Casing)

As shown in FIG. 1, the casing 10 is formed to cover the rotor 20. Stator vane rows 41 are fixed to a portion of the casing 10 that is on the inner side Dri in the radial direction Dr. A plurality of the stator vane rows 41 are disposed at intervals along the axial direction Da. In the present embodiment, the number of stator vane rows 41 is four, which is equal to the number of the rotor vane rows 31. The stator vane rows 41 are disposed to be adjacent to the plurality of rotor vane rows 31 while being on a first side Dau in the axial direction Da, respectively. The first side Dau in the axial direction Da is an upstream side in a direction in which the steam S flows in the casing 10. That is, the steam S flows from the first side Dau to a second side Dad in the axial direction Da inside the casing 10.

(Configuration of Stator Vane Row)

Figure 3:
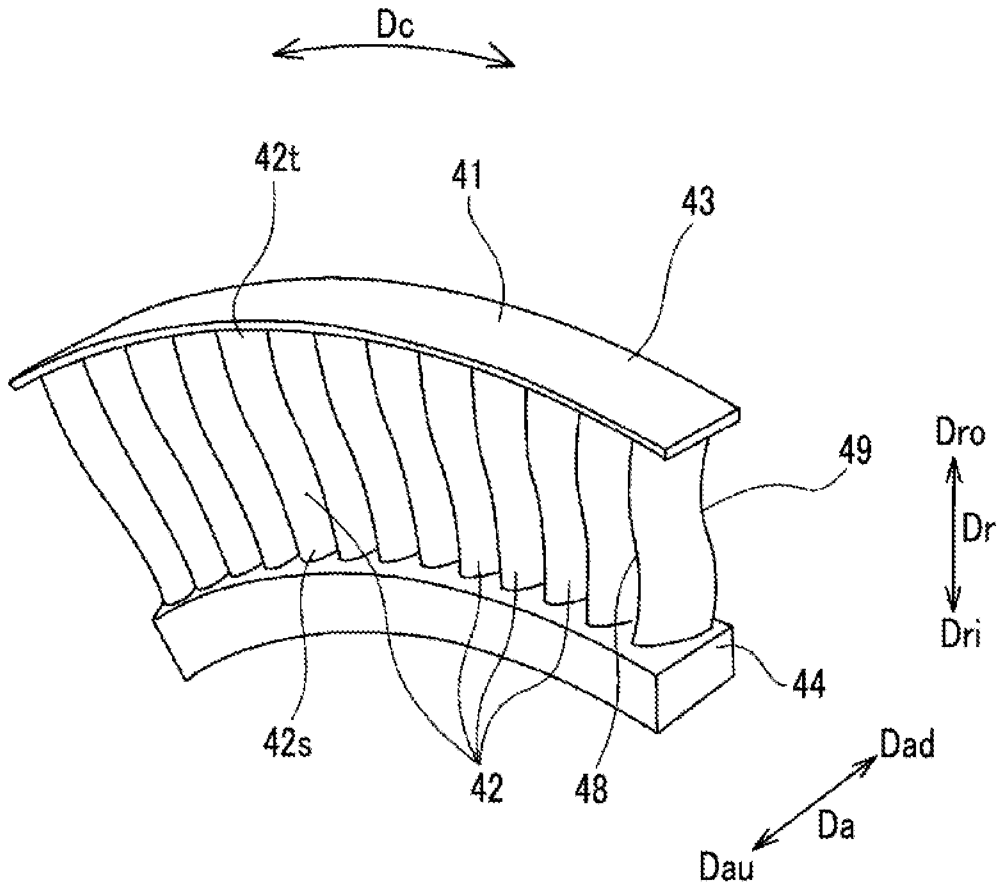
FIG. 3 is a perspective view showing a portion of the last stator vane row in the first embodiment of the present disclosure.

As shown in FIGS. 2 and 3, each of the stator vane rows 41 mainly includes stator vanes 42, an outer ring 43, and an inner ring 44. A plurality of the stator vanes 42 are disposed at intervals in the circumferential direction Dc. The outer ring 43 has an annular shape and is disposed closer to the outer side Dro in the radial direction Dr than the plurality of stator vanes 42 are. The inner ring 44 has an annular shape and is disposed closer to the inner side Dri in the radial direction Dr than the plurality of stator vanes 42 are. The steam S flows in an annular space between the outer ring 43 and the inner ring 44.

(Configuration of Stator Vane)

An inner end 42*s* of each of the stator vanes 42, which is on the inner side Dri in the radial direction Dr, is fixed to the inner ring 44. An outer end 42*t* of each of the stator vanes 42, which is on the outer side Dro in the radial direction Dr, is fixed to the outer ring 43.

Figure 4:
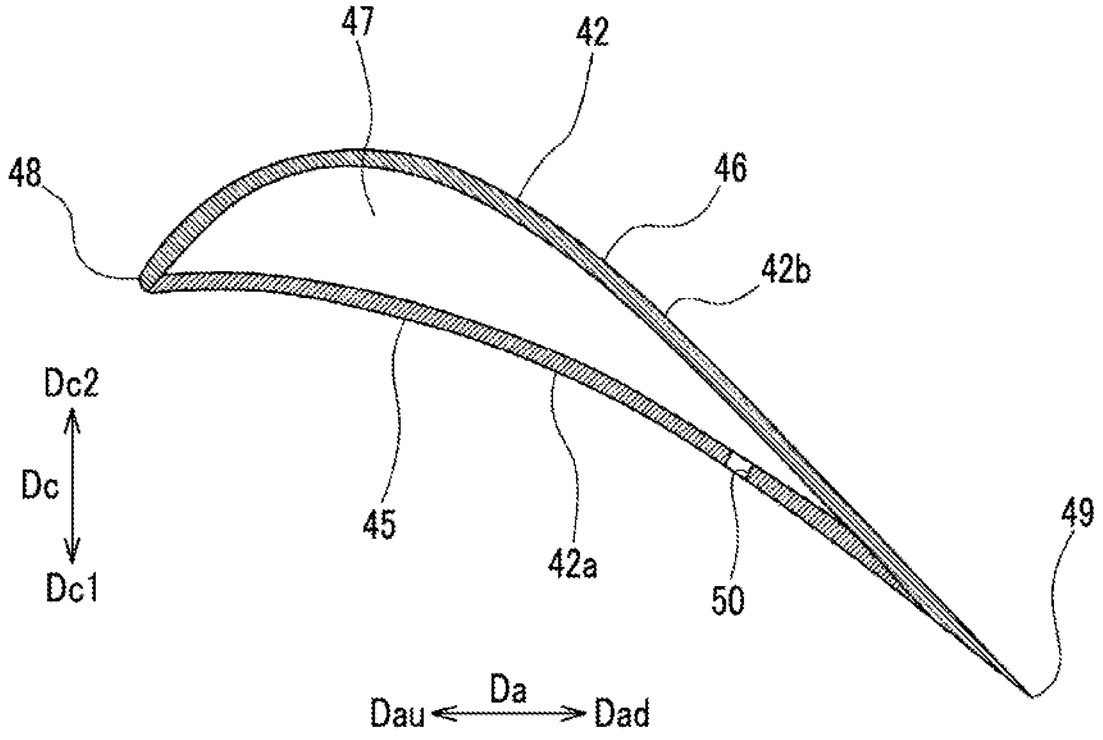
FIG. 4 is a view illustrating the cross-sectional shape of a stator vane that constitutes the last stator vane row in the first embodiment of the present disclosure.

As shown in FIG. 4, the stator vane 42 has a vane cross-sectional shape in a cross-sectional view as seen in the radial direction Dr (a direction orthogonal to the paper surface of FIG. 4) over an area from a first-side edge portion 48 to a second-side edge portion 49, the first-side edge portion 48 being on the first side Dau in the axial direction Da and the second-side edge portion 49 being on the second side Dad in the axial direction Da. The stator vane 42 includes a pressure surface 42*a* that faces one side Dc1 in the circumferential direction Dc and a suction surface 42*b* that faces the other side Dc2 in the circumferential direction Dc. The stator vane 42 is formed by a pressure-side member 45 and a suction-side member 46. The pressure-side member 45 forms the pressure surface 42*a* of the stator vane 42. The pressure-side member 45 is formed to be curved in a concave shape such that the pressure-side member 45 is recessed toward the other side Dc2 in the circumferential direction Dc. The suction-side member 46 forms the suction surface 42*b* of the stator vane 42. The suction-side member 46 is formed to be curved in a convex shape such that the suction-side member 46 protrudes toward the other side Dc2 in the circumferential direction Dc. Each of the pressure-side member 45 and the suction-side member 46 is obtained by bending a metal plate-like component into a predetermined shape. The stator vane 42 is formed by combining the pressure-side member 45 and the suction-side member 46 with each other and welding the pressure-side member 45 and the suction-side member 46. Accordingly, a cavity portion 47 is formed inside the stator vane 42, that is, between the pressure-side member 45 and the suction-side member 46.

As shown in FIG. 2, for example, the second-side edge portion 49 of the stator vane 42 may include a second-side convex portion 49*a*, a second-side concave portion 49*b*, and a vane end extending portion 49*c*.

The second-side convex portion 49*a* is formed on the inner side Dri in the radial direction Dr with respect to an intermediate position 42*m* between the outer end 42*t* and the inner end 42*s* of the stator vane 42. The second-side convex portion 49*a* is formed to be curved in a convex shape such that the second-side convex portion 49*a* protrudes toward the second side Dad in the axial direction Da. More specifically, the second-side convex portion 49*a* is formed to be curved such that the second-side convex portion 49*a* protrudes to be closer to the second side Dad in the axial direction Da than the inner end 42*s* and the intermediate position 42*m* are.

For example, the intermediate position 42*m* may be the center of a space between both ends of the second-side edge portion 49 of the stator vane 42 in the radial direction Dr.

The second-side concave portion 49*b* is continuously formed on the outer side Dro in the radial direction Dr with respect to the intermediate position 42*m*. The second-side concave portion 49*b* is formed to be recessed and curved toward the first side Dau in the axial direction Da. The second-side concave portion 49*b* is formed to be curved in a concave shape such that the second-side concave portion 49*b* is recessed to be closer to the first side Dau in the axial direction Da than the intermediate position 42*m* and the outer end 42*t* are.

The vane end extending portion 49*c* is continuously formed on the outer side Dro in the radial direction Dr with respect to the second-side concave portion 49*b*. The vane end extending portion 49*c* extends to protrude from the second-side concave portion 49*b* to the second side Dad in the axial direction Da and is connected to the outer ring 43.

Accordingly, the second-side edge portion 49 has an S-like shape as seen in the circumferential direction Dc.

For example, the first—side edge portion 48 of the stator vane 42 may include a first-side concave portion 48*a* and a first-side convex portion 48*b* and may be formed in an S-like shape.

For example, the second-side edge portion 49 may have an S-like shape over an area from the outer end 42*t* to the inner end 42*s* of the stator vane 42.

The first-side concave portion 48*a* is formed at a portion of the stator vane 42 that is on the inner side Dri in the radial direction Dr. The first-side concave portion 48*a* is formed to be curved in a concave shape such that the first-side concave portion 48*a* is recessed toward the second side Dad in the axial direction Da.

The first-side convex portion 48*b* is continuously formed on the outer side Dro in the radial direction Dr with respect to the first-side concave portion 48*a*. The first-side convex portion 48*b* is formed to be curved in a convex shape such that the first-side convex portion 48*b* protrudes toward the first side Dau in the axial direction Da.

For example, the stator vane 42 includes a communication hole 50.

In the radial direction Dr, the communication hole 50 is formed at a position closer to the outer side Dro in the radial direction Dr than the intermediate position 42*m* is.

The communication hole 50 is formed such that an outer surface of the pressure-side member 45 of the stator vane 42 and the cavity portion 47 communicate with each other.

For example, the communication hole 50 may be a slit that continuously extends in the radial direction Dr.

For example, the communication hole 50 may be, instead of a slit, one or more holes through which the outer surface of the pressure-side member 45 of the stator vane 42 and the cavity portion 47 communicate with each other.

For example, in the radial direction Dr, the communication hole 50 may be formed only at a position closer to the outer side Dro in the radial direction Dr than the intermediate position 42*m* is, the position being on the outer surface of the pressure-side member 45 of the stator vane 42.

For example, the communication hole 50 may be formed only at a position closer to the second-side edge portion 49 than the first-side edge portion 48 is, the position being on the outer surface of the pressure-side member 45 of the stator vane 42.

(Configuration of Outer Ring)

Figure 5:
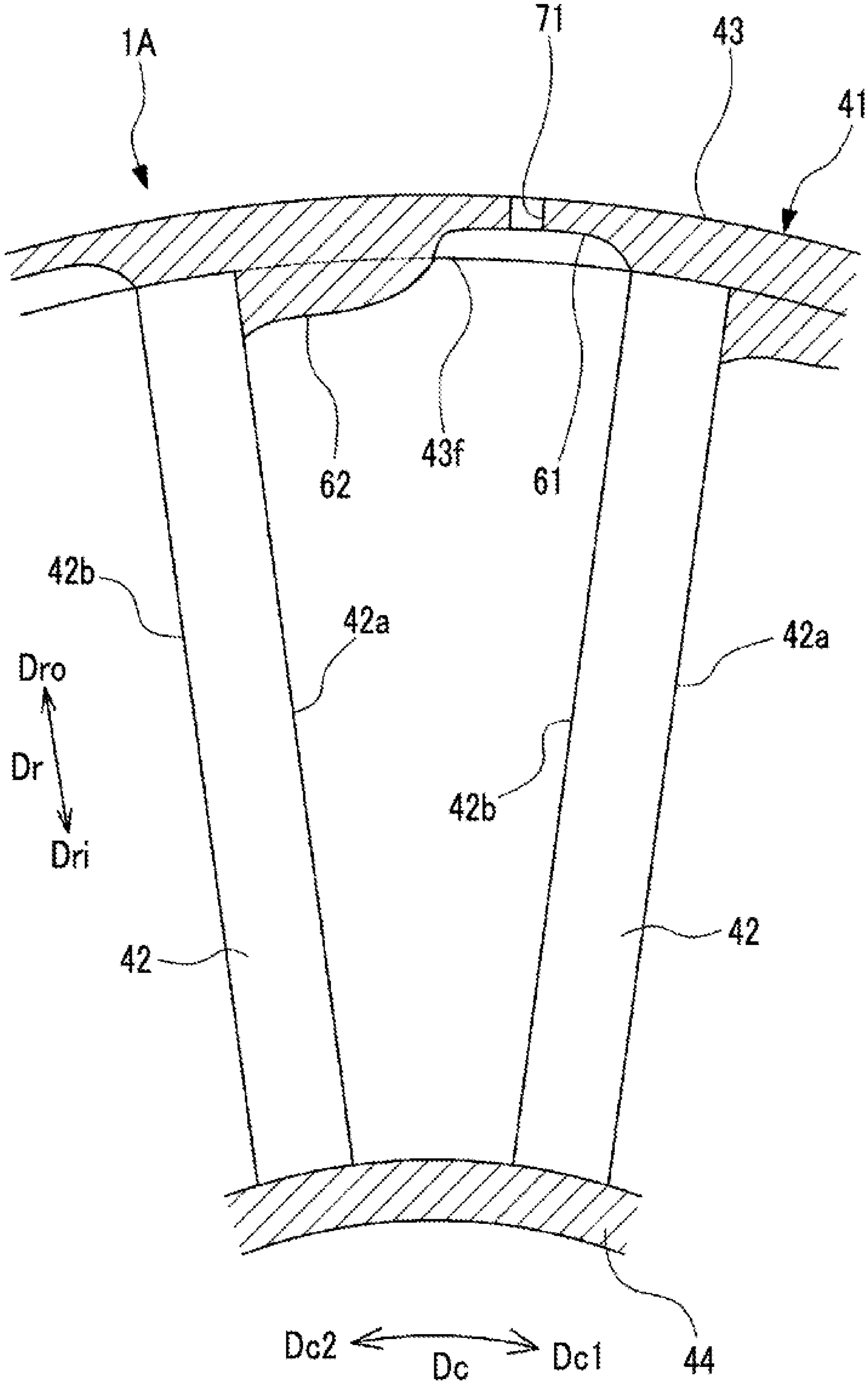
FIG. 5 is a cross-sectional view showing the last stator vane row in the first embodiment of the present disclosure as seen in an axial direction and is a cross-sectional view taken along line A-A in FIG. 2 as seen along arrows.
Figure 6:
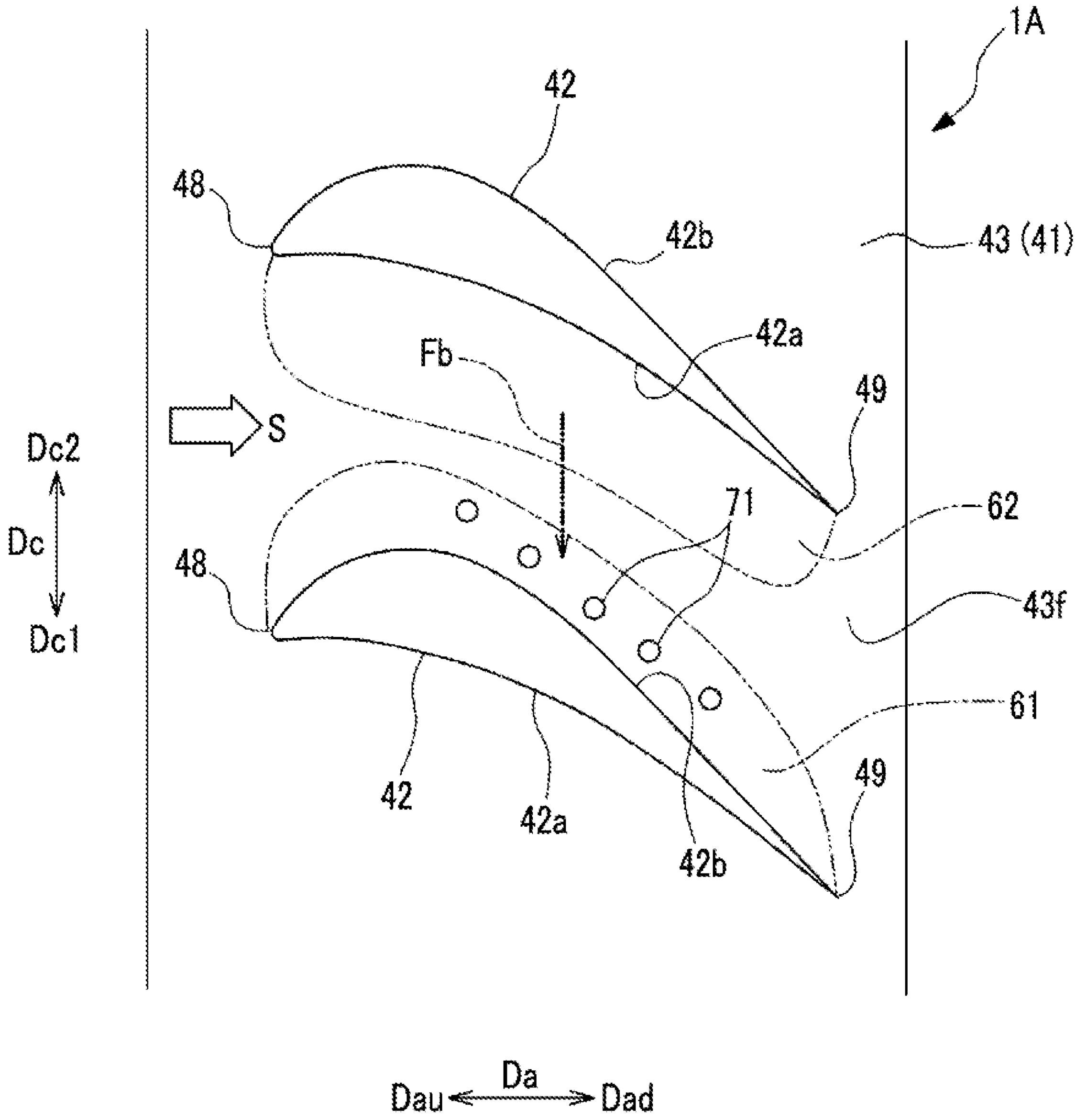
FIG. 6 is a view showing an outer ring of the last stator vane row in the first embodiment of the present disclosure as seen from an inner side in a radial direction and is a cross-sectional view taken along line B-B in FIG. 2 as seen along arrows.

As shown in FIGS. 5 and 6, a concave portion 61, a convex portion 62, and a discharge portion 71 are formed at the outer ring 43.

The concave portion 61 is formed at a ring inner peripheral surface 43*f* of the outer ring 43, the ring inner peripheral surface 43*f* facing the inner side Dri in the radial direction Dr. The concave portion 61 is formed between the stator vanes 42 that are adjacent to each other in the circumferential direction Dc. The concave portion 61 is formed on a side close to the suction surface 42*b* of one of two stator vanes 42 that is disposed on the one side Dc1 in the circumferential direction Dc, the two stator vanes 42 being adjacent to each other in the circumferential direction Dc. The concave portion 61 is formed in a concave shape recessed toward the outer side Dro in the radial direction Dr.

For example, the concave portion 61 may extend in the axial direction Da.

For example, the concave portion 61 may extend in a direction that extends along the ring inner peripheral surface 43*f* and along the suction surface 42*b* of the stator vane 42.

The convex portion 62 is formed, with respect to the concave portion 61, on a side close to the pressure surface 42*a* of one of two stator vanes 42 that is disposed on the other side Dc2 in the circumferential direction Dc, the two stator vanes 42 being adjacent to each other in the circumferential direction Dc. The convex portion 62 is formed in a convex shape protruding toward the inner side Dri in the radial direction Dr.

For example, the convex portion 62 may extend in the axial direction Da.

For example, the convex portion 62 may extend in a direction that extends along the ring inner peripheral surface 43*f* and along the pressure surface 42*a* of the stator vane 42.

The convex portion 62 can be easily formed on, for example, the ring inner peripheral surface 43*f* of the outer ring 43 through weld overlay.

The discharge portion 71 is formed in the concave portion 61. The discharge portion 71 is a slit or one or more holes that are open in the concave portion 61. A slit or a hole forming the discharge portion 71 is connected to a condenser or the like disposed outside the steam turbine 1A. Through the discharge portion 71, liquid droplets flowing into the concave portion 61 or a liquid film formed by liquid droplets (the liquid droplets or the liquid film may be referred to as a drain) is discharged to the condenser on the outside.

(Operation and Effect)

According to the steam turbine 1A as described above, the concave portion 61 that is recessed toward the outer side Dro in the radial direction Dr is formed on the ring inner peripheral surface 43*f* of the outer ring 43 at a position between the stator vanes 42 that are adjacent to each other in the circumferential direction Dc. Accordingly, liquid droplets that flow from the first side Dau in the axial direction Da inside the casing 10 and that adhere to the ring inner peripheral surface 43*f* of the outer ring 43 are collected in the concave portion 61, the liquid droplets being contained in the steam S. The collected liquid droplets are discharged to the outside through the discharge portion 71. Therefore, the amount of liquid droplets reaching the rotor vane row 31 that is on the second side Dad in the axial direction Da can be suppressed. As a result, erosion can be made less likely to occur.

In the steam turbine 1A as described above, a stream of the steam S in the stator vane row 41 comes into contact with the pressure surface 42*a* of the stator vane 42 positioned on the other side Dc2 in the circumferential direction Dc. Therefore, between two stator vanes 42 that are adjacent to each other in the circumferential direction Dc, a pressure on a side close to the pressure surface 42*a* of the stator vane 42 positioned on the other side Dc2 in the circumferential direction Dc is high, and a pressure on a side close to the suction surface 42*b* of the stator vane 42 positioned on the one side Dc1 in the circumferential direction Dc is low. With regard to this, the concave portion 61 is formed on the side close to the suction surface 42*b* of the stator vane 42 disposed on the one side Dc1 in the circumferential direction Dc, so that the size of a flow path of the steam S between the inner ring 44 and the outer ring 43 is increased in the radial direction Dr at a portion where the concave portion 61 is formed. That is, the cross-sectional area of the flow path of the steam S between the inner ring 44 and the outer ring 43 is increased at the portion where the concave portion 61 is formed. As a result, the flow velocity of the steam S is decreased, and the pressure of the steam S is increased at the portion where the concave portion 61 is formed. Accordingly, between two stator vanes 42 that are adjacent to each other in the circumferential direction Dc, a pressure on a side close to the suction surface 42*b* of the stator vane 42 positioned on the one side Dc1 in the circumferential direction Dc is increased, and thus, a pressure difference in the circumferential direction Dc between the stator vane 42 on the one side Dc1 and the stator vane 42 on the other side Dc2 that are adjacent to each other in the circumferential direction Dc is made small. As a result, a transverse stream Fb (refer to FIG. 6), which is a stream of the steam S flowing in the circumferential direction Dc and is caused by a pressure difference between stator vanes 42 adjacent to each other in the circumferential direction Dc, can be suppressed. Therefore, the swirling up of the liquid droplets caused by the transverse stream Fb is improved, and the amount of the liquid droplets reaching the rotor vane row 31 on the second side Dad in the axial direction Da can be suppressed. As a result, erosion can be made less likely to occur.

The steam turbine 1A as described above includes the convex portion 62 that is formed on the side close to the pressure surface 42*a* of the stator vane 42 disposed on the other side Dc2 in the circumferential direction Dc. At the portion where the convex portion 62 is formed, the size of the flow path of the steam S between the inner ring 44 and the outer ring 43 is decreased in the radial direction Dr. That is, the cross-sectional area of the flow path of the steam S between the inner ring 44 and the outer ring 43 is decreased at the portion where the convex portion 62 is formed. As a result, the flow velocity of the steam S is increased, and the pressure of the steam S is decreased at the portion where the convex portion 62 is formed. Accordingly, between two stator vanes 42 that are adjacent to each other in the circumferential direction Dc, a pressure on a side close to the pressure surface 42*a* of the stator vane 42 positioned on the other side Dc2 in the circumferential direction Dc is decreased, and thus, a pressure difference in the circumferential direction Dc between the stator vane 42 on the one side Dc1 and the stator vane 42 on the other side Dc2 that are adjacent to each other in the circumferential direction Dc is made smaller (balanced). As a result, the transverse stream Fb, which is a stream of the steam S flowing in the circumferential direction Dc and is caused by a pressure difference between stator vanes 42 adjacent to each other in the circumferential direction Dc, can be further suppressed. Therefore, the swirling up of the liquid droplets caused by the transverse stream Fb is improved, and the amount of the liquid droplets reaching the rotor vane row 31 on the second side Dad in the axial direction Da can be suppressed. As a result, erosion can be made less likely to occur.

In the steam turbine 1A as described above, the second-side concave portion 49*b* of the second-side edge portion 49 of the stator vane 42 is recessed toward the first side Dau in the axial direction Da. Therefore, an interval S1 between the second-side concave portion 49*b* and the rotor vane 32 of a last rotor vane row 31F is made large in the axial direction Da. Accordingly, because of the effect of a centrifugal force caused by a swirling stream flowing out from the stator vane 42, liquid droplets flow from the stator vane 42 to the second side in the axial direction Da and flow to the outer side Dro in the radial direction Dr via a steam stream represented by virtual lines L1 in FIG. 2. Therefore, the amount of liquid droplets reaching an end portion 32*a* of the rotor vane 32 that is on the first side Dau in the axial direction Da can be suppressed. As a result, erosion can be made less likely to occur.

In addition, the second-side convex portion 49*a* of the second-side edge portion 49 of the stator vane 42 protrudes toward the second side Dad in the axial direction Da. Therefore, an interval S2 between the second-side convex portion 49*a* and the last rotor vane row 31F can be made small in comparison with the interval S1 at the second-side concave portion 49*b*. As a result, a decrease in turbine performance can be suppressed. In addition, since the interval S2 between the second-side convex portion 49*a* and the rotor vane 32 of the last rotor vane row 31F is made small, an increase in bearing span can be suppressed, and a decrease in shaft vibration reliability can be suppressed. In addition, since the second-side convex portion 49*a* is formed on the inner side Dri in the radial direction Dr, the circumferential speed of a stream of the steam S is small in comparison with the outer side Dro in the radial direction Dr, and thus, erosion is not likely to occur. As a result, occurrence of erosion can be suppressed more effectively.

The steam turbine 1A as described above further includes the vane end extending portion 49*c* that is continuously formed on the outer side Dro in the radial direction Dr with respect to the second-side concave portion 49*b* and that extends toward the second side Dad in the axial direction Da.

Accordingly, because of the effect of a centrifugal force caused by a swirling stream flowing out from the stator vane 42, liquid droplets flowing toward the outer side Dro in the radial direction Dr can be restrained from being accumulated at the second-side concave portion 49*b*. Therefore, the liquid droplets are smoothly guided from the vane end extending portion 49*c* to the outer ring 43. Since the liquid droplets are guided to the outer ring 43 in such a manner, the amount of liquid droplets reaching the end portion 32*a* of the rotor vane 32 on the first side Dau in the axial direction Da can be suppressed more effectively.

According to the steam turbine 1A as described above, the first-side edge portion 48 includes the first-side concave portion 48*a* and the first-side convex portion 48*b* and has an S-like shape.

Accordingly, the vane surface length of the stator vane 42 at a time when the first-side edge portion 48 and the second-side edge portion 49 are connected in the axial direction Da is restrained from being locally large in comparison with a case where the first-side edge portion 48 of the stator vane 42 is formed in a linear shape extending along the radial direction Dr. Specifically, the length of a flow path from the first-side concave portion 48*a* to the second-side convex portion 49*a* and the length of a flow path from the first-side convex portion 48*b* to the second-side concave portion 49*b* along the axial direction Da can be restrained from being significantly different from each other. Accordingly, a friction loss generated between the liquid droplets and a surface of the stator vane 42 can be restrained from being significantly different in parts in the radial direction Dr.

In addition, in the steam turbine 1A, at least a portion of liquid droplets can be recovered at the cavity portion 47 in the stator vane 42 through the communication hole 50. Accordingly, the amount of liquid droplets reaching the end portion 32*a* of the rotor vane 32 that is on the first side Dau in the axial direction Da can be suppressed more effectively. Therefore, it is possible to more significantly achieve an effect in which it is possible to effectively suppress the occurrence of erosion while suppressing a decrease in turbine performance and a decrease in shaft vibration reliability.

In addition, in the steam turbine 1A, the communication hole 50 is formed closer to the outer side Dro in the radial direction Dr than the intermediate position 42*m* is. Therefore, the processing area of the communication hole 50 can be reduced.

In addition, in the steam turbine 1A, the communication hole 50 is formed closer to the outer side Dro in the radial direction Dr than the intermediate position 42*m* is. Therefore, the cavity portion 47 of the stator vane 42 can be made small in relation to the position of the communication hole 50. Therefore, liquid droplets in the cavity portion 47 are easily discharged.

In addition, in the steam turbine 1A, the communication hole 50 is formed only at a position closer to the second-side edge portion 49 than the first-side edge portion 48 is, the position being on the outer surface of the pressure-side member 45 of the stator vane 42.

Therefore, the second-side edge portion 49 of the stator vane 42 can have a heat blocking structure.

Second Embodiment

Next, a second embodiment of the steam turbine according to the present disclosure will be described. The steam turbine in the second embodiment is different from the steam turbine of the first embodiment only in that a first groove 63 is provided in the concave portion 61. Therefore, in the description of the second embodiment, the same parts as those of the first embodiment will be described with the same reference numerals, and repetitive description will be omitted. That is, the description about the configuration of each part of the steam turbine which has the same configuration as that in the first embodiment will be omitted.

Figure 7:
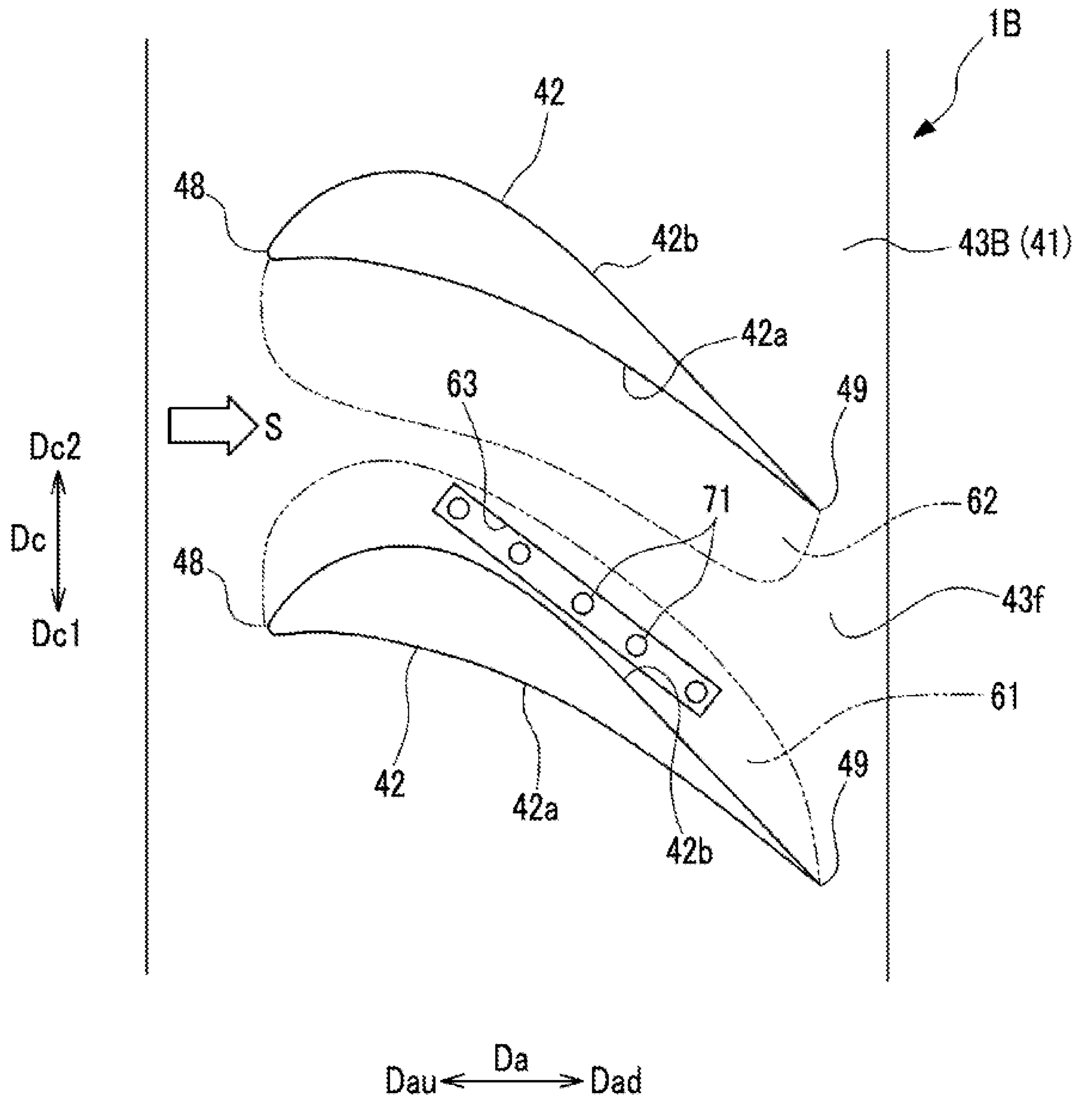
FIG. 7 is a view showing an outer ring of a last stator vane row in a second embodiment of the present disclosure as seen from an inner side in a radial direction.
Figure 8:
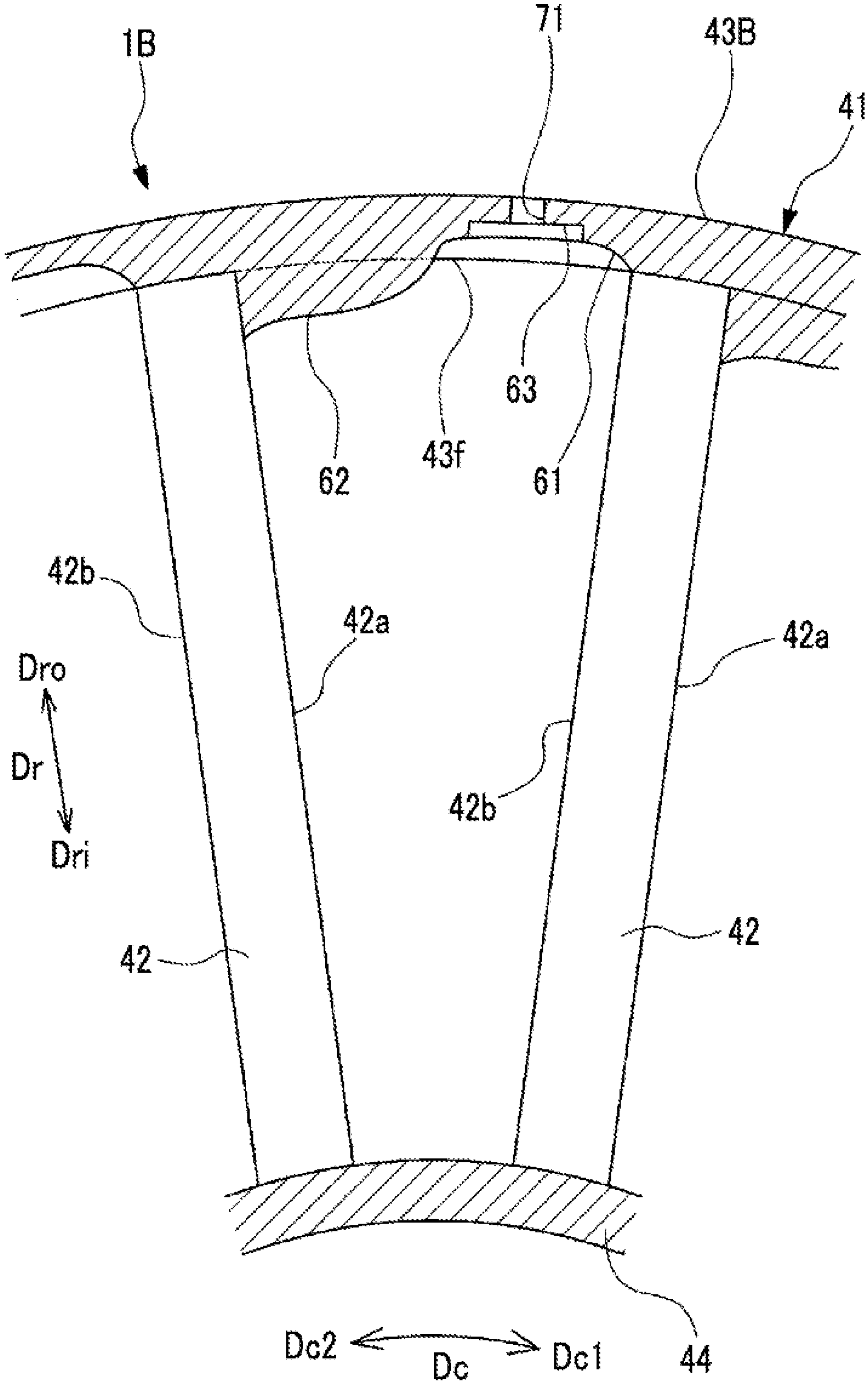
FIG. 8 is a cross-sectional view showing the last stator vane row in the second embodiment of the present disclosure as seen in an axial direction.

As shown in FIGS. 7 and 8, an outer ring 43B of a steam turbine 1B of the present embodiment includes the concave portion 61, the convex portion 62, the first groove 63, and the discharge portion 71.

In the concave portion 61, the first groove 63 is formed. The first groove 63 is formed to be recessed toward the outer side Dro in the radial direction Dr from the concave portion 61. The first groove 63 extends in the axial direction Da. The first groove 63 extends to intersect a direction connecting the pressure surface 42*a* of the stator vane 42 positioned on the other side Dc2 in the circumferential direction Dc and the suction surface 42*b* of the stator vane 42 positioned on the one side Dc1 in the circumferential direction Dc.

For example, the first groove 63 may extend in a direction that extends along the ring inner peripheral surface 43*f* and along the pressure surface 42*a* of the stator vane 42.

For example, the first groove 63 may extend in a direction in which the concave portion 61 extends.

The discharge portion 71 is formed in the first groove 63. The discharge portion 71 is a slit or a hole that is open in the first groove 63. The discharge portion 71 is connected to a condenser or the like disposed outside the steam turbine 1B. Through the discharge portion 71, liquid droplets flowing into the first groove 63 from the inside of the concave portion 61 or a liquid film formed by liquid droplets is discharged to the condenser on the outside.

(Operation and Effect)

According to the steam turbine 1B as described above, the occurrence of erosion can be suppressed more effectively, as with the first embodiment.

In addition, in the steam turbine 1B, liquid droplets entering the concave portion 61 can be efficiently recovered via the first groove 63 and discharged to the outside through the discharge portion 71.

In addition, according to the steam turbine 1B as described above, the first groove 63 extends in the axial direction Da. Accordingly, liquid droplets that are moved by the transverse stream Fb in the circumferential direction Dc along the ring inner peripheral surface 43*f* can be efficiently collected at the first groove 63, the transverse stream Fb being caused by a pressure difference between stator vanes 42 adjacent to each other in the circumferential direction Dc.

Modification Example of Second Embodiment

Figure 9:
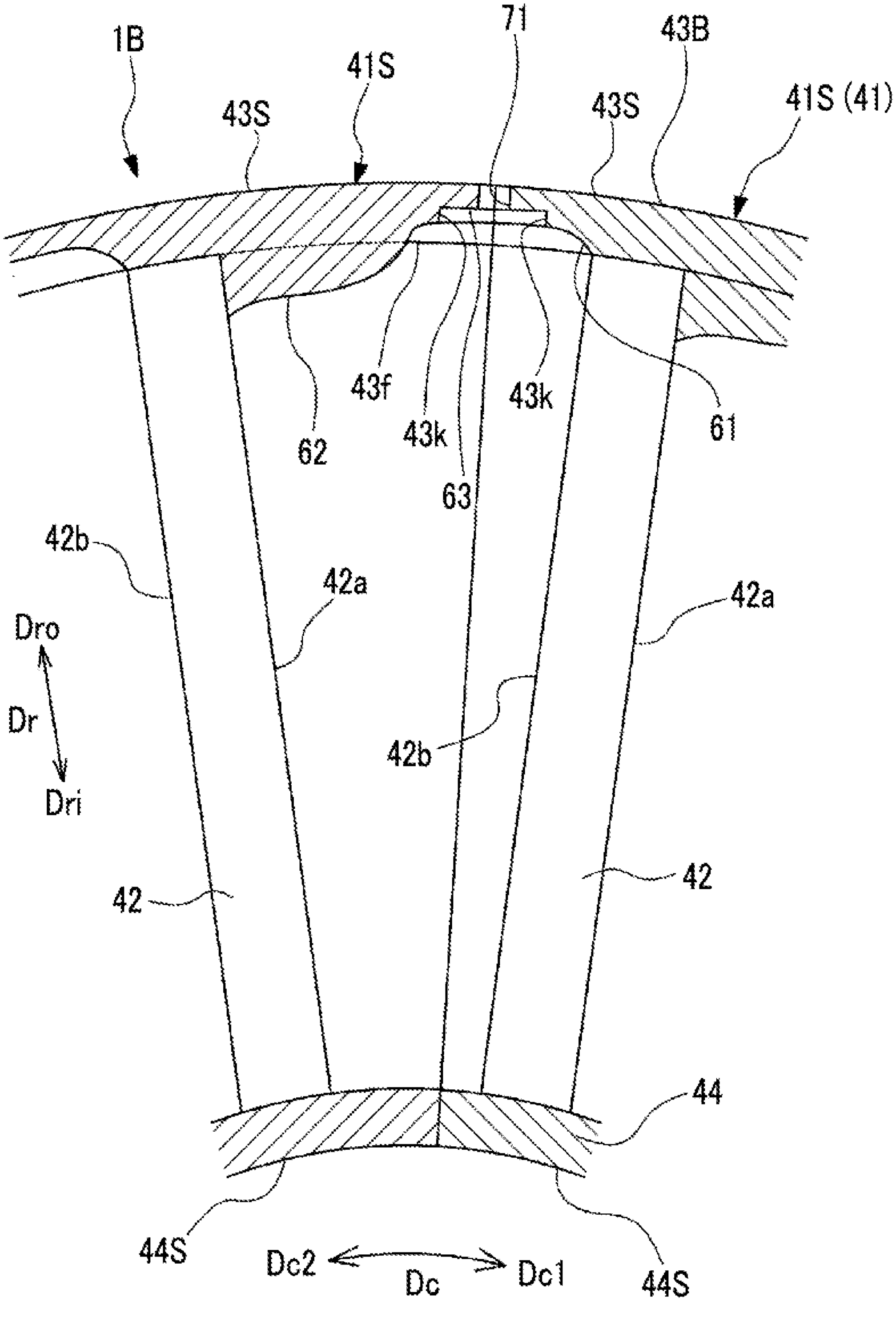
FIG. 9 is a cross-sectional view showing a last stator vane row in a modification example of the second embodiment of the present disclosure as seen in an axial direction.

As shown in FIG. 9, the stator vane row 41 of the steam turbine 1B as described above may be composed of a plurality of stator vane row segments 41S into which the stator vane row 41 is divided in the circumferential direction Dc. Each of the stator vane row segments 41S integrally includes a ring segment 43S which is one of a plurality of segments into which the outer ring 43 is divided in the circumferential direction Dc, an inner ring segment 44S which is one of a plurality of segments into which the inner ring 44 is divided in the circumferential direction Dc, and the stator vane 42. The stator vane row segments 41S are bonded to each other by being caused to abut against each other in the circumferential direction Dc.

In such a configuration, the discharge portion 71 and the first groove 63 are formed at a joint between the ring segments 43S that are adjacent to each other in the circumferential direction Dc. In this case, a notch 43*k* is formed on each of one of the ring segments 43S that is positioned on the one side Dc1 in the circumferential direction Dc and the other of the ring segments 43S that is positioned on the other side Dc2 in the circumferential direction Dc. The discharge portion 71 and the first groove 63 are formed when the notches 43*k* of the ring segments 43S adjacent to each other in the circumferential direction Dc abut against each other.

Since the discharge portion 71 and the first groove 63 are formed at the joint between the ring segments 43S as described above, the discharge portion 71 or the first groove 63 can be easily formed when the ring segments 43S are connected to each other at the time of assembly of the stator vane row 41.

Third Embodiment

Next, a third embodiment of the steam turbine according to the present disclosure will be described. The steam turbine in the third embodiment is different from the steam turbine of the second embodiment only in that a second groove 65 and a second discharge portion 73 are provided. Therefore, in the description of the third embodiment, the same parts as those of the second embodiment will be described with the same reference numerals, and repetitive description will be omitted. That is, the description will be made focusing on differences between the second embodiment and the third embodiment, and the description about the same configuration as that in the first embodiment and the second embodiment will be omitted.

Figure 10:
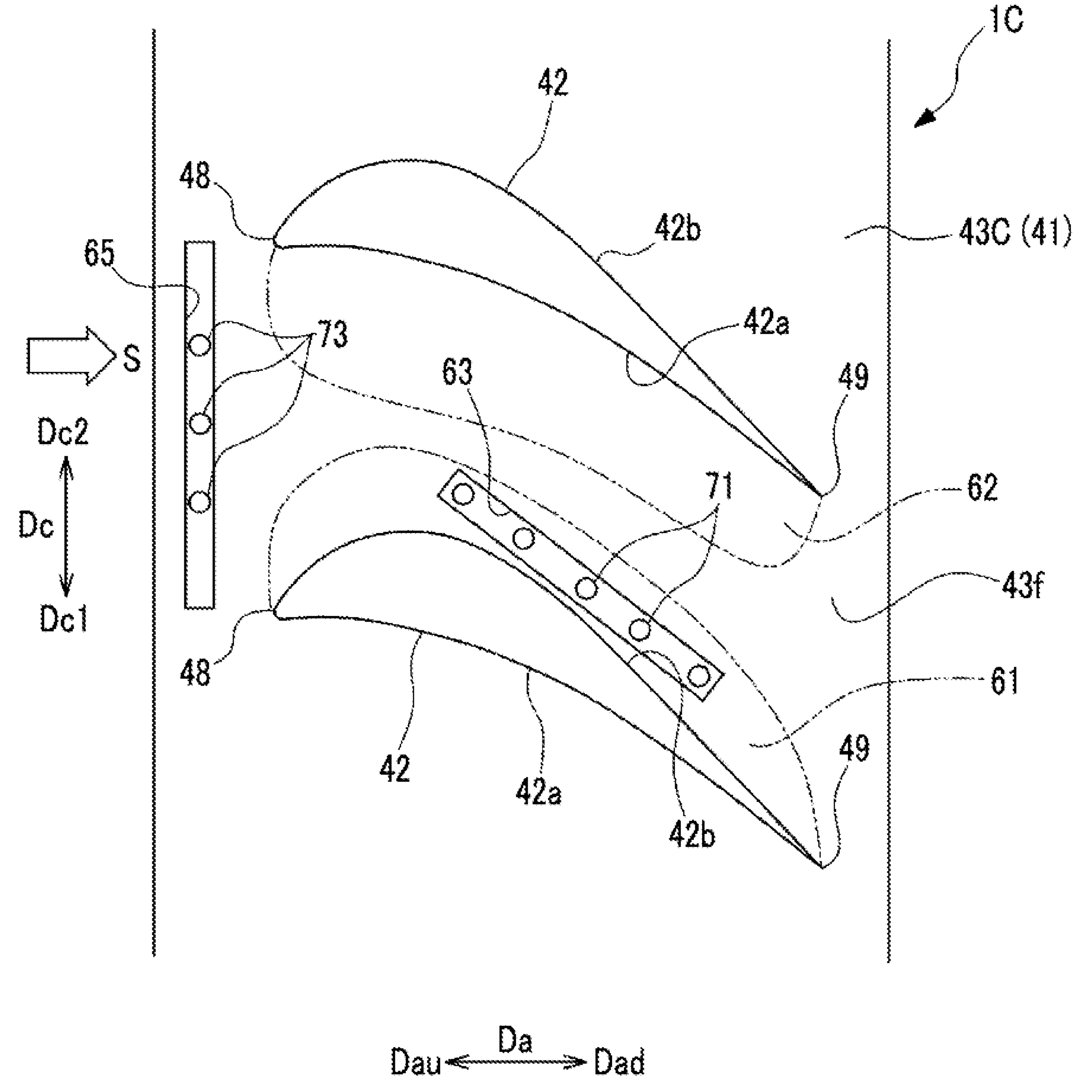
FIG. 10 is a view showing an outer ring of a last stator vane row in a third embodiment of the present disclosure as seen from an inner side in a radial direction.

As shown in FIG. 10, an outer ring 43C of a steam turbine 1C of the present embodiment includes the concave portion 61, the convex portion 62, the first groove 63, the discharge portion 71, the second groove 65, and the second discharge portion 73.

The second groove 65 is formed on the first side Dau in the axial direction Da with respect to the plurality of stator vanes 42 constituting the stator vane row 41 at the ring inner peripheral surface 43*f*. The second groove 65 continuously extends in the circumferential direction Dc. The second groove 65 is formed to be recessed toward the outer side Dro in the radial direction Dr.

The second discharge portion 73 is open in the second groove 65. The second discharge portion 73 is a slit or a hole that is open in the second groove 65. The second discharge portion 73 is connected to a condenser or the like disposed outside the steam turbine 1C. Through the second discharge portion 73, liquid droplets flowing into the second groove 65 or a liquid film formed by liquid droplets is discharged to the condenser on the outside.

(Operation and Effect)

According to the steam turbine 10 as described above, the occurrence of erosion can be suppressed more effectively, as with the first embodiment and the second embodiment.

In addition, in the steam turbine 1C, liquid droplets contained in the steam S can be collected at the second groove 65 and discharged to the outside through the second discharge portion 73, the second groove 65 being formed on the first side Dau in the axial direction Da with respect to the stator vanes 42 of the stator vane row 41. Accordingly, it is possible to reduce the amount of liquid droplets reaching a position that is closer to the second side Dad in the axial direction Da than the second groove 65 is.

Other Embodiments

Note that the present disclosure is not limited to the above-described embodiments, and the design can be changed without departing from the gist of the present disclosure.

For example, in the above-described embodiments, the second-side convex portion 49*a* and the second-side concave portion 49*b* of the second-side edge portion 49 are formed to be curved. However, the specific shapes thereof are not limited. For example, the second-side convex portion 49*a* and the second-side concave portion 49*b* may be curved with a constant curvature, and the curvatures of the second-side convex portion 49*a* and the second-side concave portion 49*b* may be partially different from each other.

In addition, although each of the first-side edge portion 48 and the second-side edge portion 49 has an S-like shape, the present disclosure is not limited thereto. The first-side edge portion 48 and the second-side edge portion 49 may be linear, for example.

In addition, for example, in addition to the number of stages of the rotor vane rows 31 and the stator vane rows 41, the configuration of each part of the steam turbines 1A, 1B, and 1C can be appropriately changed.

<Appendix>

The steam turbines 1A, 1B, and 1C described in the embodiments are understood as follows, for example.

(1) The steam turbines 1A, 1B, and 1C according to a first aspect include: the rotor shaft 21 that rotates around the axis O; the plurality of rotor vane rows 31 that are disposed at intervals in the axial direction Da along the axis O, the rotor vane rows 31 being fixed to a portion of the rotor shaft 21 that is on the outer side Dro in the radial direction Dr; the casing 10 that is disposed to cover the rotor shaft 21 and the plurality of rotor vane rows 31; and the stator vane rows 41 that are disposed at intervals in the axial direction Da and that are disposed on the first side Dau in the axial direction Da with respect to the plurality of rotor vane rows 31, respectively, the stator vane rows 41 being fixed to a portion of the casing 10 that is on the inner side Dri in the radial direction Dr. The stator vane row 41 includes the plurality of stator vanes 42 that are disposed at intervals in the circumferential direction Dc and each of which extends in the radial direction Dr, the outer rings 43, 43B, and 43C that have an annular shape and that are disposed closer to the outer side Dro in the radial direction Dr than the plurality of stator vanes 42 are, the inner ring 44 that has an annular shape and that is disposed closer to the inner side Dri in the radial direction Dr than the plurality of stator vanes 42 are, the concave portion 61 that is formed at the ring inner peripheral surface 43*f* facing the inner side Dri in the radial direction Dr at the outer rings 43, 43B, and 43C and that is recessed toward the outer side Dro in the radial direction Dr between stator vanes 42 adjacent to each other in the circumferential direction Dc, and the discharge portion 71 that is open in the concave portion 61 and through which liquid droplets accumulated in the concave portion 61 are discharged to an outside.

Examples of the discharge portion 71 include a slit and a hole.

In the case of the steam turbines 1A, 1B, and 1C, the concave portion 61 that is recessed toward the outer side Dro in the radial direction Dr is formed on the ring inner peripheral surface 43*f* of the outer rings 43, 43B, and 43C at a position between the stator vanes 42 that are adjacent to each other in the circumferential direction Dc. Accordingly, liquid droplets that flow from the first side Dau in the axial direction Da inside the casing 10 and that adhere to the ring inner peripheral surface 43*f* of the outer rings 43, 43B, and 43C are collected in the concave portion 61, the liquid droplets being contained in the steam S. The collected liquid droplets are discharged to the outside through the discharge portion 71. Therefore, the amount of liquid droplets reaching the rotor vane row 31 that is on the second side Dad in the axial direction Da can be suppressed. As a result, erosion can be made less likely to occur.

(2) The steam turbines 1A, 1B, and 1C according to a second aspect are the steam turbines 1A, 1B, and 1C of (1) in which the stator vane 42 includes the pressure surface 42*a* that is formed to face the one side Dc1 in the circumferential direction Dc and that is formed to be curved in a concave shape, and the suction surface 42*b* that is formed to face the other side Dc2 in the circumferential direction Dc and that is formed to be curved in a convex shape, and the concave portion 61 is formed on a side close to the suction surface 42*b* of one of two stator vanes 42 that is disposed on the one side Dc1 in the circumferential direction Dc, the two stator vanes 42 being adjacent to each other in the circumferential direction Dc.

In such a configuration, a stream of the steam S in the stator vane row 41 comes into contact with the pressure surface 42*a* of the stator vane 42 positioned on the other side Dc2 in the circumferential direction Dc. Therefore, between two stator vanes 42 that are adjacent to each other in the circumferential direction Dc, a pressure on a side close to the pressure surface 42*a* of the stator vane 42 positioned on the other side Dc2 in the circumferential direction Dc is high, and a pressure on a side close to the suction surface 42*b* of the stator vane 42 positioned on the one side Dc1 in the circumferential direction Dc is low. With regard to this, the concave portion 61 is formed on the side close to the suction surface 42*b* of the stator vane 42 disposed on the one side Dc1 in the circumferential direction Dc, so that the size of a flow path of the steam S between the inner ring 44 and the outer rings 43, 43B, and 43C is increased in the radial direction Dr at a portion where the concave portion 61 is formed. That is, the cross-sectional area of the flow path of the steam S between the inner ring 44 and the outer rings 43, 43B, and 43C is increased at the portion where the concave portion 61 is formed. As a result, the flow velocity of the steam S is decreased, and the pressure of the steam S is increased at the portion where the concave portion 61 is formed. Accordingly, between two stator vanes 42 that are adjacent to each other in the circumferential direction Do, a pressure on a side close to the suction surface 42*b* of the stator vane 42 positioned on the one side Dc1 in the circumferential direction Dc is increased, and thus, a pressure difference in the circumferential direction Dc between the stator vane 42 on the one side Dc1 and the stator vane 42 on the other side Dc2 that are adjacent to each other in the circumferential direction Dc is made small. As a result, the transverse stream Fb, which is a stream of the steam S flowing in the circumferential direction Dc and is caused by a pressure difference between stator vanes 42 adjacent to each other in the circumferential direction Dc, can be suppressed. Therefore, the swirling up of the liquid droplets caused by the transverse stream Fb is improved, and the amount of the liquid droplets reaching the rotor vane row 31 on the second side Dad in the axial direction Da can be suppressed. As a result, erosion can be made less likely to occur.

(3) The steam turbines 1A, 1B, and 1C according to a third aspect are the steam turbines 1A, 1B, and 1C of (1) or (2) further including the convex portion 62 that protrudes toward the inner side Dri in the radial direction Dr and that is formed, with respect to the concave portion 61, on a side close to the pressure surface 42*a* of one of the two stator vanes 42 that is disposed on the other side Dc2 in the circumferential direction Dc, the two stator vanes 42 being adjacent to each other in the circumferential direction Dc.

According to such a configuration, the size of the flow path of the steam S between the inner ring 44 and the outer rings 43, 43B, and 43C is decreased in the radial direction Dr at the portion where the convex portion 62 is formed in a case where the convex portion 62 is formed on the side close to the pressure surface 42*a* of the stator vane 42 disposed on the other side Dc2 in the circumferential direction Dc. That is, the cross-sectional area of the flow path of the steam S between the inner ring 44 and the outer rings 43, 43B, and 43C is decreased at the portion where the convex portion 62 is formed. As a result, the flow velocity of the steam S is increased, and the pressure of the steam S is decreased at the portion where the convex portion 62 is formed. Accordingly, between two stator vanes 42 that are adjacent to each other in the circumferential direction Dc, a pressure on a side close to the pressure surface 42*a* of the stator vane 42 positioned on the other side Dc2 in the circumferential direction Dc is decreased, and thus, a pressure difference in the circumferential direction Dc between the stator vane 42 on the one side Dc1 and the stator vane 42 on the other side Dc2 that are adjacent to each other in the circumferential direction Dc is made smaller. As a result, the transverse stream Fb, which is a stream of the steam S flowing in the circumferential direction Dc and is caused by a pressure difference between stator vanes 42 adjacent to each other in the circumferential direction Dc, can be further suppressed. Therefore, the swirling up of the liquid droplets caused by the transverse stream Fb is improved, and the amount of the liquid droplets reaching the rotor vane row 31 on the second side Dad in the axial direction Da can be suppressed. As a result, erosion can be made less likely to occur.

(4) The steam turbines 1B and 1C according to a fourth aspect are the steam turbines 1B and 1C of any one of (1) to (3) in which the first groove 63 that is recessed toward the outer side Dro in the radial direction Dr is formed in the concave portion 61, and the discharge portion 71 is open in the first groove 63.

Accordingly, liquid droplets entering the concave portion 61 can be efficiently recovered via the first groove 63 and discharged to the outside through the discharge portion 71.

(5) The steam turbines 1B and 1C according to a fifth aspect are the steam turbines 1B and 1C of (4) in which the first groove 63 extends in the axial direction Da.

Accordingly, liquid droplets that are moved by the transverse stream Fb in the circumferential direction Dc along the ring inner peripheral surface 43*f* can be efficiently collected at the first groove 63, the transverse stream Fb being caused by a pressure difference between stator vanes 42 adjacent to each other in the circumferential direction Dc.

(6) The steam turbine 1B according to a sixth aspect is the steam turbine 1B of (4) or (5) in which the outer ring 43C is composed of the plurality of ring segments 43S into which the outer ring 43C is divided in the circumferential direction Dc, and the first groove 63 is formed at a joint between the ring segments 43S that are adjacent to each other in the circumferential direction Dc.

Since the first groove 63 is formed at the joint between the ring segments 43S as described above, the first groove 63 can be easily formed when the ring segments 43S are connected to each other at the time of assembly of the stator vane row 41.

(7) The steam turbine 1C according to a seventh aspect is the steam turbine 1C of any one of (1) to (6) further comprising the second groove 65 that is formed on the first side Dau in the axial direction Da with respect to the stator vane 42 at the ring inner peripheral surface 43*f* and that is recessed toward the outer side Dro in the radial direction Dr, and the second discharge portion 73 that is open in the second groove 65 and through which liquid droplets entering the second groove 65 are discharged to the outside.

Accordingly, liquid droplets contained in the steam S can be collected at the second groove 65 and discharged to the outside through the second discharge portion 73, the second groove 65 being formed on the first side Dau in the axial direction Da with respect to the stator vanes 42 of the stator vane row 41. Accordingly, it is possible to reduce the amount of liquid droplets reaching a position that is closer to the second side Dad in the axial direction Da than the second groove 65 is.

(8) The steam turbines 1A, 1B, and 1C according to an eighth aspect are the steam turbines 1A, 1B, and 1C of any one of (1) to (7) in which, at a last stator vane row 41F that is disposed to be closest to the second side Dad in the axial direction Da among the plurality of stator vane rows 41, the second-side edge portion 49 of the stator vane 42 that is on the second side Dad in the axial direction Da has an S-like shape including the second-side convex portion 49*a* that is formed on the inner side Dri in the radial direction Dr with respect to the intermediate position 42*m* between the outer end 42*t* of the stator vane 42 on the outer side Dro in the radial direction Dr and the inner end 42*s* of the stator vane 42 on the inner side Dri in the radial direction Dr and that protrudes while being curved toward the second side Dad in the axial direction Da, and the second-side concave portion 49*b* that is formed on the outer side Dro in the radial direction Dr with respect to the intermediate position 42*m* and that is recessed while being curved toward the first side Dau in the axial direction Da.

Accordingly, the second-side concave portion 49*b* of the second-side edge portion 49 of the stator vane 42 is recessed toward the first side Dau in the axial direction Da. Therefore, an interval S1 between the second-side concave portion 49*b* and the rotor vane 32 of a last rotor vane row 31F is made large in the axial direction Da. Accordingly, because of the effect of a centrifugal force caused by a swirling stream flowing out from the stator vane 42, liquid droplets flow from the stator vane 42 to the second side in the axial direction Da and flow to the outer side Dro in the radial direction Dr via a steam stream. Therefore, the amount of liquid droplets reaching an end portion 32*a* of the rotor vane 32 that is on the first side Dau in the axial direction Da can be suppressed. As a result, erosion can be made less likely to occur.

In addition, the second-side convex portion 49*a* of the second-side edge portion 49 of the stator vane 42 protrudes toward the second side Dad in the axial direction Da. Therefore, an interval 32 between the second-side convex portion 49*a* and the rotor vanes 32 of the last row can be made small in comparison with the interval S1 at the second side concave portion 49*b*. As a result, a decrease in turbine performance can be suppressed. In addition, an increase in bearing span can be suppressed, and a decrease in shaft vibration reliability can be suppressed.

INDUSTRIAL APPLICABILITY

According to the steam turbine described above, occurrence of erosion can be suppressed more effectively.

REFERENCE SIGNS LIST

1A, 1B, 1C: steam turbine
10: casing
20: rotor
21: rotor shaft
22: shaft core portion
23: disc portions
31: rotor vane rows
31F: last rotor vane row
32: rotor vane
32*a*: end portion
34: shroud
35: platform
41: stator vane row
41F: last stator vane row
41S: stator vane row segment
42: stator vane
42*a*: pressure surface
42*b*: suction surface
42*m*: intermediate position
42*s*: inner end
42*t*: outer end
43, 43B, 43C: outer ring
43S: ring segment
43*f*: ring inner peripheral surface
43*k*: notch
44: inner ring
44S: inner ring segment
45: pressure-side member
46: suction-side member
47: cavity portion
48: first-side edge portion
48*a*: first-side concave portion
48*b*: first-side convex portion
49: second-side edge portion
49*a*: second-side convex portion
49*b*: second-side concave portion
49*c*: vane end extending portion
50: communication hole
61: concave portion
62: convex portion
63: first groove
65: second groove
71: discharge portion
73: second discharge portion
Da: axial direction
Dad: second side
Dau: first side
Dc: circumferential direction
Dc1: one side
Dc2: the other side
Dr: radial direction
Dri: inner side
Dro: outer side
Fb: transverse stream
L1: virtual line
O: axis
S: steam

The invention claimed is:

1. A steam turbine comprising:

a rotor shaft that rotates around an axis;

a plurality of rotor vane rows that are disposed at intervals in an axial direction along the axis, the rotor vane rows being fixed to a portion of the rotor shaft that is on an outer side in a radial direction;

a casing that is disposed to cover the rotor shaft and the plurality of rotor vane rows; and stator vane rows that are disposed at intervals in the axial direction and that are disposed on a first side in the axial direction with respect to the plurality of rotor vane rows, respectively, the stator vane rows being fixed to a portion of the casing that is on an inner side in the radial direction, wherein each stator vane row includes a plurality of stator vanes that are disposed at intervals in a circumferential direction and each of which extends in the radial direction, an outer ring that has an annular shape and that is disposed closer to the outer side in the radial direction than the plurality of stator vanes are, an inner ring that has an annular shape and that is disposed closer to an inner side in the radial direction than the plurality of stator vanes are, a concave portion that is formed at a ring inner peripheral surface facing the inner side in the radial direction at the outer ring and that is recessed toward the outer side in the radial direction between two stator vanes adjacent to each other in the circumferential direction of the plurality of stator vanes, a convex portion that is formed at the ring inner peripheral surface and that protrudes toward the inner side in the radial direction between the two stator vanes adjacent to each other, and a discharge portion that is open in the concave portion and through which liquid droplets accumulated in the concave portion are discharged to an outside, wherein each of the plurality of stator vane includes a pressure surface that is formed to face a first side in the circumferential direction and that is formed to be curved in a concave shape, and a suction surface that is formed to face a second side in the circumferential direction and that is formed to be curved in a convex shape, wherein the concave portion is formed, with respect to the convex portion, on a side closer to a suction surface than to a pressure surface of one of the two stator vanes adjacent to each other that is disposed on the first side in the circumferential direction, and wherein the convex portion is formed, with respect to the concave portion, on a side closer to a pressure surface than to a suction surface of another of the two stator vanes adjacent to each other that is disposed on the second side in the circumferential direction.

2. The steam turbine according to claim 1, wherein a first groove that is recessed toward the outer side in the radial direction is formed in the concave portion, and the discharge portion is open in the first groove.

3. The steam turbine according to claim 2, wherein the first groove extends in the axial direction.

4. The steam turbine according to claim 2, wherein the outer ring is composed of a plurality of ring segments into which the outer ring is divided in the circumferential direction, and the first groove is formed at a joint between the ring segments that are adjacent to each other in the circumferential direction.

5. The steam turbine according to claim 1, further comprising:

a second groove that is formed on the first side in the axial direction with respect to the stator vane at the ring inner peripheral surface and that is recessed toward the outer side in the radial direction; and a second discharge portion that is open in the second groove and through which liquid droplets entering the second groove are discharged to the outside.

6. The steam turbine according to claim 1, wherein, at a last stator vane row that is disposed to be closest to a second side in the axial direction among the plurality of stator vane rows, a second-side edge portion of the stator vane that is on the second side in the axial direction has an S-like shape including a second-side convex portion that is formed on the inner side in the radial direction with respect to an intermediate position between an outer end of the stator vane on the outer side in the radial direction and an inner end of the stator vane on the inner side in the radial direction and that protrudes while being curved toward the second side in the axial direction, and a second-side concave portion that is formed on the outer side in the radial direction with respect to the intermediate position and that is recessed while being curved toward the first side in the axial direction.

* * * * *